United States Patent [19]
Kappei

[11] 3,838,745
[45] Oct. 1, 1974

[54] MOUNTING SUPPORT FOR THE BATTERY BOX IN THE CARRIAGE OF BATTERY DRIVEN VEHICLES

[76] Inventor: Friedhelm Kappei, am pfingstanger 9, 3163 Sehnde, Germany

[22] Filed: Dec. 22, 1972

[21] Appl. No.: 317,747

[30] Foreign Application Priority Data
Dec. 23, 1971  Germany............................ 2164072

[52] U.S. Cl.................... 180/68.5, 104/34, 105/51, 312/333
[51] Int. Cl............................................. B60r 1/04
[58] Field of Search......... 180/68.5, 65, 60; 105/51, 105/50; 104/34; 312/348, 341, 333

[56] References Cited
UNITED STATES PATENTS

| | | | |
|---|---|---|---|
| 565,407 | 8/1896 | Eickemeyer | 105/51 |
| 778,560 | 12/1904 | Whiting | 104/34 |
| 1,209,962 | 12/1916 | Heath | 180/68.5 |
| 2,559,380 | 7/1951 | Wikman | 312/348 X |

*Primary Examiner*—David Schonberg
*Assistant Examiner*—Milton L. Smith
*Attorney, Agent, or Firm*—Roland I. Griffin

[57] ABSTRACT

A battery driven vehicle is provided with a pair of guide rails and with a battery box having rollers on its underside for movement along the guide rails. Arresting recesses are provided in the guide rails to receive the rollers of the battery box only when the battery box is fully inserted to its normal rest position.

5 Claims, 3 Drawing Figures

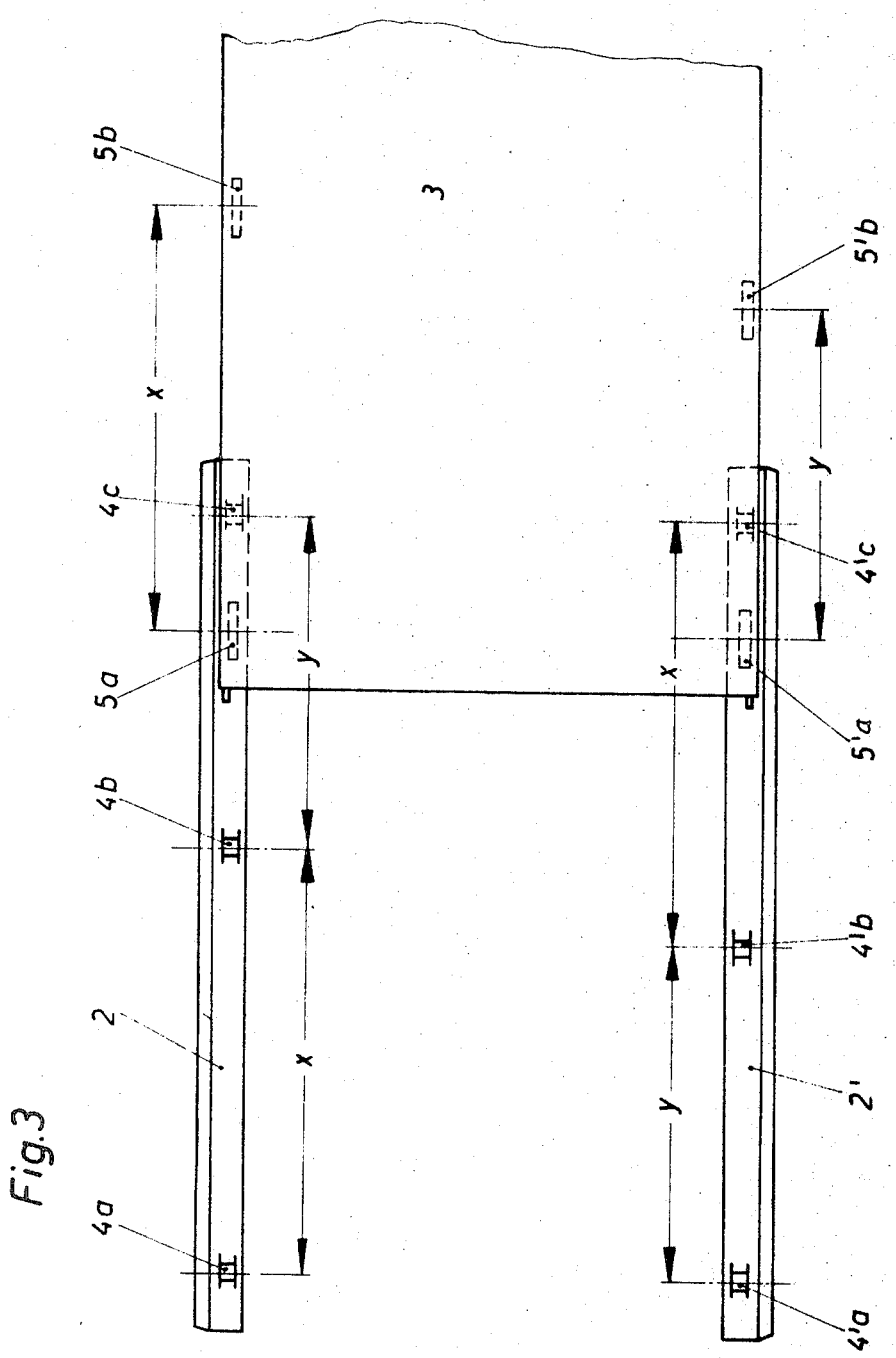

MOUNTING SUPPORT FOR THE BATTERY BOX IN THE CARRIAGE OF BATTERY DRIVEN VEHICLES

BACKGROUND AND SUMMARY OF THE INVENTION

This invention is related to a mounting support for the battery box in the carriage of a battery driven vehicle, where guiding rails are provided for the battery box. It is known to provide rollers on the bottom side of the battery box carrying a so-salled "traction battery" or to provide such rollers along the guiding rails so that the battery box can easily be inserted into the guiding means. The disadvantage of these approaches is that the position of the battery box in the guiding means is not stable and that, in addition, securing means have to be actuated in order to bring the battery box into its correct position and to fix it in this position.

It is the object of this invention to overcome these shortcomings and to provide means which permit the battery box to be easily passed into its correct final position, i.e., its rest position. According to the preferred embodiment of this invention this is achieved by providing notches or recesses in the guiding rails or in the bottom of the battery box to receive the rollers contained between the guiding rails and the battery box when the battery box is inserted to its rest position. The arresting recesses and/or the rollers are located such that all rollers can only be introduced into the corresponding recesses when the battery box is inserted to its rest position. Suitably, the arresting recesses are provided in the guiding rails and the rollers are supported in the bottom of the battery box whereby it is also made possible to move the battery box easily outside of the vehicle.

It is especially advantageous to locate the arresting recesses in the guiding rails and the rollers in the battery box at positions displaced relatively to each other such that the rollers and the arresting recesses overlie each other only in the inserted rest position of the battery box. For example, the recesses and the rollers can be arranged in a nonsymmetrical manner relative to each other or to the axis of displacement of the battery box, or the recesses and/or the rollers may have different distances between each other in the direction of displacement of the battery box, or they may be contained in different tracks.

The inventive concept can be embodied in different manners, some of which are shown in the drawings.

DESCRIPTION OF THE DRAWINGS

FIG. 3 is a top view of the guiding means and partially inserted battery box of FIG. 2.

DESCRIPTION OF THE PREFERRED EMBODIMENT

Figure 1:
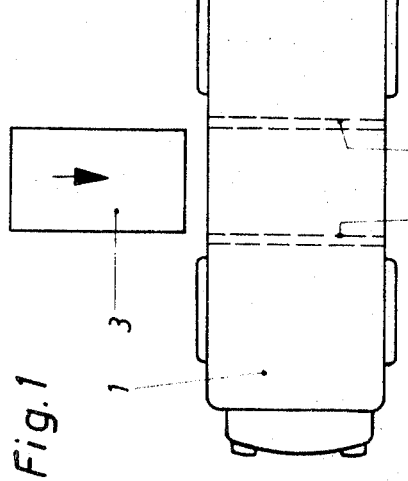
FIG. 1 is a schematic illustration of a battery driven vehicle and a battery box to be inserted therein.

Referring to FIG. 1, parallel guiding rails 2 and 2' are located in the carriage of the battery driven vehicle 1 between the axles. The battery box 3 containing the traction battery belonging to the vehicle drive is laterally inserted onto these rails. As these batteries have only a limited capacity it is necessary to replace them periodically by recharged batteries. In this regard it is of importance in view of the position of the current connections at the battery box or at the carriage that the battery always be in a secure position when it is in its inserted condition, i.e., in its rest position.

Figure 2:
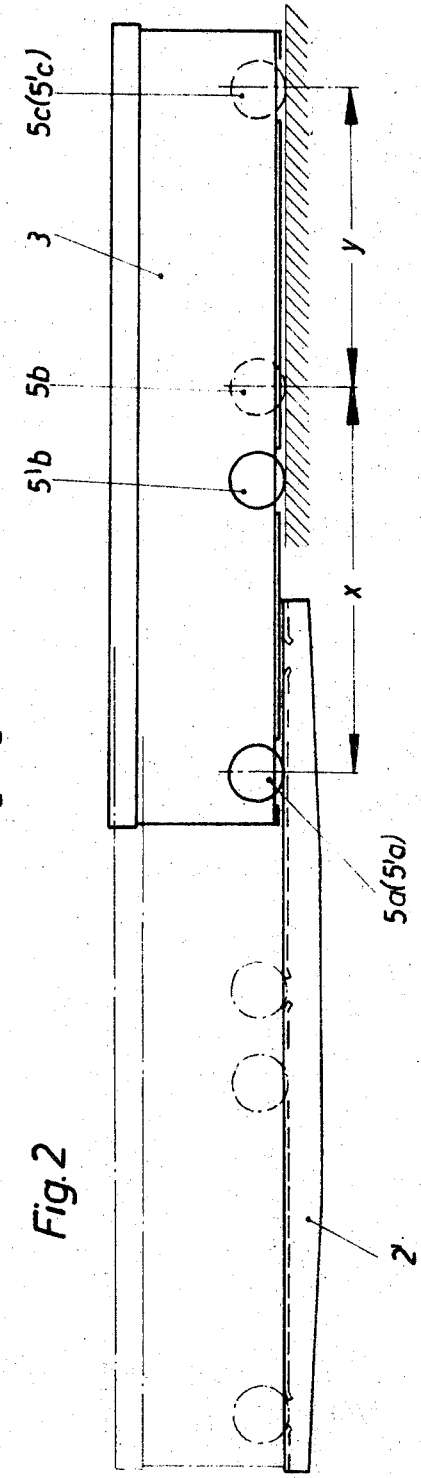
FIG. 2 is a side view of the guiding means of FIG. 1 with the battery box already partially inserted.

As best shown in FIGS. 2 and 3, the insertion and extraction of the relatively heavy battery box is facilitated by rollers 5a, 5b, 5c, 5'a, 5'b, and 5'c provided at the battery box. These rollers extend downwards from the bottom of the battery box and roll on the guiding rails 2 and 2'. The guiding rails 2 and 2' in turn have recesses 4a, 4b, 4c, 4'a, 4'b and 4'c, which serve to receive the respective rollers of the battery box 3 when it is inserted to its rest position. The rollers 5a through 5'c of the battery box are then supported in the respective arresting recesses 4a through 4'c, respectively, and the bottom of the battery box is then directly supported on the rails 2 and 2' if the arresting recesses 4a through 4'c are sufficiently large.

In order to secure the battery box 3 in its rest position, as determined by the position of the current connecting contacts, and to permit easy insertion and extraction of the battery, the arresting recesses and the rollers are located in a manner such that a correspondence between the rollers and the corresponding recesses is obtained only in the rest position. As illustrated in FIG. 3, the arresting recesses 4a and 4b provided in the guiding rail 2 on the right side of the battery box 3 are spaced apart by the distance x in the direction of insertion while the recesses 4b and 4c are separated by the smaller distance y. Accordingly, the corresponding rollers 5a, 5b, and 5c on the right side of the battery box 3 are separated by the same distances x and y, as illustrated in FIG. 2. In the guiding rail 2' on the left side of the battery box 3 the recesses 4'a and 4'b are spaced apart by the distance y and the recesses 4'b and 4'c are spaced apart by the distance x. Accordingly, the corresponding rollers 5'a, 5'b, and 5'c are separated by the same distances y and x. Due to the arrangement of the rollers and arresting recesses and the selection of the distances x and y, the corresponding rollers and arresting recesses are only in coincidence in the rest position. During proper inserting action some rollers will always be supported on the guiding rails and will pass over the arresting recesses that do not correspond thereto in the rest position.

As soon as the battery carrying car has been laterally moved to the guiding rails 2 and 2' in the battery driven vehicle 1, the battery box 3 can be inserted onto the guiding rails 2 and 2' in the direciton of the arrow, as illustrated in FIG. 1. The two front rollers a and 5'a roll over the two recesses 4c and 4'c as the battery box is still supported by the rollers 5b, 5c, 5'b, and 5'c, on the guiding rails of the battery carrying car. Upon further insertion, the roller 5'b rolls onto the guiding rail 2'. The roller 5a can roll over the recess 4b in the rail 2 as the battery box is supported by the remaining rollers. Upon still further insertion, the roller 5'a rolls over the recess 4'b. Similarly, the recesses 4c and 4'c are also rolled over by the rollers 5'b and 5b which are displaced relative to each other in the direction of insertion. The corresponding rollers and arresting recesses 5a and 4a, 5b and 4b, 5c and 4c, 5'a and 4'a, 5'b and 4'b, and 5'c and 4'c are in coincidence only in the final rest position of the battery box 3 when the current connecting contacts are engaged with each other. It is only in this position that the rollers can enter into the corresponding recesses.

Of course, the inventive arrangement of the rollers and of the recesses is not limited to the illustrated embodiment. For example, the rollers and recesses may be provided in different tracks or may have a different kind of asymmetry so that insertion and extraction of the battery box is possible without the rollers entering into the recesses and so that a correspondence of all rollers and recesses is only given in the rest position of the battery box. As the same problems encountered with the insertion of the battery box into the vehicle also arise when the battery is still on the battery carrying car, the invention is also related to a respective arrangement of the recesses in the guiding rails of the battery carrying car.

I claim:

1. Apparatus for supporting a battery box in a carriage of a battery driven vehicle, said apparatus comprising a pair of parallel guiding rails positioned in the carriage of the battery driven vehicle, a plurality of rollers positioned between a bottom portion of the battery box and the guiding rails to support the battery box on the guiding rails, and a corresponding plurality of arresting recesses positioned along a pair of parallel axes in the direction of insertion of the battery box into the carriage of the battery driven vehicle and in the guiding rails themselves or in the bottom portion of the battery box, the arresting recesses positioned along one of said axes being spaced from one another differently than those positioned along the other of those axes so that the rollers are received by the arresting recesses only when the battery box has been fully inserted to a rest position in the carriage of the battery driven vehicle.

2. Apparatus as in claim 1 wherein the arresting recesses are provided in the guiding rails and the rollers are supported on the bottom portion of the battery box.

3. Apparatus as in claim 2 wherein the arresting recesses and the rollers are nonsymmetrical relative to the axis of displacement of the battery box on the guiding rails.

4. Apparatus as in claim 2 wherein at least some of the arresting recesses or the rollers are located in different tracks.

5. Apparatus as in claim 2 including a pair of guiding rails mounted in a battery carrying car and provided with a plurality of arresting recesses for receiving the rollers of the battery box only when the battery box has been fully inserted to a rest position in the battery carrying car.

* * * * *